US008364578B1

(12) United States Patent
Honarvar

(10) Patent No.: US 8,364,578 B1
(45) Date of Patent: Jan. 29, 2013

(54) SIMULTANEOUS CUSTOMER/ACCOUNT STRATEGY EXECUTION IN A DECISION MANAGEMENT SYSTEM

(75) Inventor: Laurence Honarvar, Arnold, MD (US)

(73) Assignee: CGI Technologies and Solutions Inc., Fairfax, VA (US)

( * ) Notice: Subject to any disclaimer, the term of this patent is extended or adjusted under 35 U.S.C. 154(b) by 887 days.

(21) Appl. No.: 09/216,985

(22) Filed: Dec. 21, 1998

Related U.S. Application Data

(60) Provisional application No. 60/076,910, filed on Mar. 5, 1998.

(51) Int. Cl.
*G06Q 40/00* (2012.01)
*G06Q 30/00* (2012.01)

(52) U.S. Cl. ................................ 705/38; 705/26.62

(58) Field of Classification Search ............ 705/38, 705/35; 186/37; 235/379, 380
See application file for complete search history.

(56) References Cited

U.S. PATENT DOCUMENTS

| | | | | |
|---|---|---|---|---|
| 4,597,046 A | * | 6/1986 | Musmanno et al. | 705/36 |
| 4,774,663 A | * | 9/1988 | Musmanno et al. | 705/36 |
| 5,177,684 A | | 1/1993 | Harker et al. | 364/436 |
| 5,182,793 A | | 1/1993 | Alexander et al. | 395/13 |
| 5,195,041 A | * | 3/1993 | George et al. | 700/100 |
| 5,404,292 A | | 4/1995 | Hendrickson | 364/413.02 |
| 5,481,647 A | | 1/1996 | Brody et al. | 395/51 |
| 5,517,405 A | | 5/1996 | McAndrew et al. | 364/401 |
| 5,560,005 A | * | 9/1996 | Hoover et al. | 395/600 |
| 5,630,127 A | | 5/1997 | Moore et al. | 395/615 |
| 5,649,116 A | | 7/1997 | McCoy et al. | 395/238 |
| 5,687,322 A | | 11/1997 | Deaton et al. | 395/214 |
| 5,696,907 A | | 12/1997 | Tom | 395/238 |
| 5,701,400 A | * | 12/1997 | Amado | 706/45 |
| 5,706,406 A | | 1/1998 | Pollock | 395/55 |
| 5,758,183 A | * | 5/1998 | Scales | 395/825 |
| 5,875,236 A | | 2/1999 | Jankowitz et al. | 379/114 |
| 5,875,431 A | * | 2/1999 | Heckman et al. | 705/7.16 |
| 5,930,764 A | | 7/1999 | Melchione et al. | 705/10 |
| 5,940,816 A | | 8/1999 | Fuhrer et al. | 706/13 |
| 5,953,704 A | | 9/1999 | McIlroy et al. | 705/2 |
| 5,999,908 A | * | 12/1999 | Abelow | 705/7.32 |
| 6,009,420 A | | 12/1999 | Fagg, III et al. | 706/45 |
| 6,012,051 A | | 1/2000 | Sammon, Jr. et al. | 706/52 |
| 6,016,477 A | | 1/2000 | Ehnebuske et al. | 705/7 |
| 6,018,718 A | * | 1/2000 | Walker et al. | 705/14 |
| 6,018,722 A | * | 1/2000 | Ray et al. | 705/36 |
| 6,021,397 A | | 2/2000 | Jones et al. | 705/36 |
| 6,029,138 A | | 2/2000 | Khorasani et al. | 705/2 |
| 6,029,149 A | | 2/2000 | Dykstra et al. | 705/38 |
| 6,029,153 A | | 2/2000 | Bauchner et al. | 705/42 |
| 6,088,686 A | * | 7/2000 | Walker et al. | 705/38 |
| 6,115,691 A | | 9/2000 | Ulwick | 705/7 |
| 6,119,103 A | | 9/2000 | Basch et al. | 705/35 |
| 6,125,359 A | | 9/2000 | Lautzenheiser et al. | 706/60 |

(Continued)

FOREIGN PATENT DOCUMENTS

| | | | | |
|---|---|---|---|---|
| DE | 2257200 | * | 6/1974 | 705/38 |
| EP | 0 205 873 A2 | | 12/1986 | |

(Continued)

*Primary Examiner* — Asfand Sheikh
(74) *Attorney, Agent, or Firm* — Staas & Halsey LLP

(57) ABSTRACT

A computer-implemented decision management process for evaluating a customer having more than one account. An iterative function, such as an iterative decision tree, is provided to evaluate the customer and each of the accounts interactively and interchangeably in a single pass. The iterative function has virtual attributes for accessing customer data and/or account data. The process iterates through the iterative function in accordance with the number of accounts of the customer.

30 Claims, 16 Drawing Sheets

U.S. PATENT DOCUMENTS

| | | | |
|---|---|---|---|
| 6,128,599 A | 10/2000 | Walker et al. | 705/14 |
| 6,151,565 A | 11/2000 | Lobley et al. | 703/2 |
| 6,163,604 A | 12/2000 | Baulier et al. | 379/189 |
| 6,182,060 B1 | 1/2001 | Hedgcock et al. | 707/1 |
| 6,188,988 B1 | 2/2001 | Barry et al. | 705/3 |
| 6,195,530 B1 * | 2/2001 | Smith et al. | 455/5.1 |
| 6,236,975 B1 | 5/2001 | Boe et al. | 705/7 |
| 6,249,775 B1 | 6/2001 | Freeman et al. | 705/36 |
| 6,275,818 B1 | 8/2001 | Subramanian et al. | 707/2 |
| 6,286,005 B1 | 9/2001 | Cannon | 707/100 |
| 6,292,787 B1 | 9/2001 | Scott et al. | 705/36 |
| 6,405,173 B1 * | 6/2002 | Honarvar et al. | 705/7.36 |
| 6,684,192 B2 * | 1/2004 | Honarvar et al. | 705/7.31 |
| 7,076,475 B2 * | 7/2006 | Honarvar | 706/47 |

FOREIGN PATENT DOCUMENTS

| | | |
|---|---|---|
| EP | 0 230 349 A2 | 7/1987 |
| EP | 0 762 306 A2 | 3/1997 |
| EP | 0 849 693 A2 | 6/1998 |
| EP | 0 915 422 A1 | 5/1999 |
| EP | 1 035 485 A2 | 9/2000 |
| EP | 1 073 249 A2 | 1/2001 |
| EP | 1 102 187 A2 | 5/2001 |
| EP | 1 139 257 A1 | 10/2001 |
| JP | 359216265 * | 12/1984 ... 705/38 |
| WO | WO 97/09666 | 3/1997 |
| WO | WO 97/29447 | 8/1997 |
| WO | WO 97/34246 | 9/1997 |
| WO | WO 98/49641 | 11/1998 |
| WO | WO 98/49642 | 11/1998 |
| WO | WO 98/54667 | 12/1998 |
| WO | WO 99/09503 | 2/1999 |
| WO | WO 99/13427 | 3/1999 |
| WO | WO 99/39290 | 8/1999 |
| WO | WO 00/34910 | 6/2000 |
| WO | WO 00/34911 | 6/2000 |
| WO | WO 00/54186 | 9/2000 |
| WO | WO 00/57312 | 9/2000 |
| WO | WO 00/65502 | 11/2000 |
| WO | WO 00/72268 A1 | 11/2000 |
| WO | WO 01/16851 A2 | 3/2001 |
| WO | WO 01/39090 A1 | 5/2001 |
| WO | WO 01/39589 A2 | 6/2001 |
| WO | WO 01/45012 A2 | 6/2001 |
| WO | WO 01/46876 A2 | 6/2001 |
| WO | WO 01/50306 A2 | 7/2001 |
| WO | WO 01/50336 A1 | 7/2001 |
| WO | WO 01/57756 A1 | 8/2001 |
| WO | WO 01/61598 A1 | 8/2001 |
| WO | WO 01/75754 A1 | 10/2001 |

* cited by examiner

SIMULTANEOUS CUSTOMER/ACCOUNT STRATEGY EXECUTION IN A DECISION MANAGEMENT SYSTEM

CROSS REFERENCE TO RELATED APPLICATION

This application claims priority to provisional application 60/076,910, filed Mar. 5, 1998, and which is incorporated herein by reference.

This application is related to U.S. application titled DECISION MANAGEMENT SYSTEM FOR CREATING STRATEGIES TO CONTROL MOVEMENT OF CLIENTS ACROSS CATEGORIES, inventor Laurence Honarvar, Ser. No. 09/217,017, filed concurrently herewith, and which is incorporated herein by reference.

This application is related to U.S. application titled USE OF ONLINE ANALYTICAL PROCESSING (OLAP) IN A RULES BASED DECISION MANAGEMENT SYSTEM, inventors Laurence Honarvar, Steve Campbell, and Traci Showalter, Ser. No. 09/217,016, filed concurrently herewith, and which is incorporated herein by reference.

BACKGROUND OF THE INVENTION

1. Field of the Invention

The present invention relates to a decision management system for creating strategies to manage customers of an organization. More specifically, the present invention relates to a decision management system to simultaneously evaluate customer and account data.

2. Description of the Related Art

A typical organization maintains a significant amount of information about its customers to support the services of the organization. This information can be effectively used, for example, to increase productivity and reduce costs, while achieving the goals of the organization. Such goals may be to improve profitability and maximize customer value.

For example, a company may sell various products to its customers, and may maintain a significant amount of information relating to its customers. This information can be used to improve many critical interactions with the customers, such as marketing communications, sales calls, customer service, collections, and general relationship management activities.

Consider the following examples.

Assume that a diversified financial services company is trying to leverage its customer base by cross-selling its various products. It currently uses limited internal customer information and credit bureau information to identify existing customers for cross-sell campaigns. For example, they might send "invitations to apply" for a home equity loan to those customers who own a mortgage with the company, and meet a minimum credit bureau score threshold. Imagine how much more powerful their cross-selling efforts would be if they could use information from all of the customers' accounts to offer pre-approved home equity loans to customers where the likelihood of a sale was high, the probability of default was low, and the financial value of that sale was high.

As another example, assume that a regional bell operating company is currently applying only age-based criteria (e.g., "days past due") to its accounts receivable portfolio to identify candidates for its collections department and to handle those customers. The content of the outbound collection notices and phone calls is driven solely by the age and amount of a customer's unpaid balance. Imagine if the company had a tool that helped it select and prioritize collection accounts based on the likelihood of a customer interaction making a bottom line difference. Instead of calling or writing all overdue accounts, they could focus resources on those where the customer interaction would make the greatest difference. In addition, they would save the expense and ill will generated by calling customers who would pay without a collections contact.

As a still further example, assume that a manager of a large telephone customer service center for a super-regional bank has been given only hard-line corporate policy to make decisions about fee and rate concessions. While her service reps attempt to stay to the company line, she is deluged with requests from good customers to talk to the manager. She uses her judgment based on the incomplete information available to her to decide which concessions are appropriate to prevent attrition of profitable customers. Just imagine if the service reps had guidelines that were specific to each customer, based upon customer data that indicates their value to the organization, likelihood of attrition, risk level, and other characteristics. The manager could stand by these guidelines with confidence. There would be no concessions made to unprofitable customers, fewer manager overrides, shorter calls, and reduced attrition of the customers they want to keep.

As diverse as the above examples appear on the surface, they share several common characteristics. Each involves a large customer base and a high volume of customer interactions. Each organization has a substantial amount of accumulated data regarding the characteristics, purchasing/behavior patterns, and profitability of customers (though the data may not yet be well organized or analyzed). Each organization has an opportunity to improve performance substantially by treating different customers and customer groups differently, due to diversity in customer relationships and their potential. In each case, there are desired outcomes that could result from alternative customer interactions (e.g., customer purchases a product, pays an outstanding bill, increases deposit balances), and those outcomes can readily be identified, quantified, and tracked.

In sum, each of the above examples depicts a business situation that currently is not fully benefiting from decision support and therefore is yielding less than optimal results.

There are software based products in the marketplace which can organize information to make more effective decisions. For example, the American Management Systems (AMS) Strata™ decision support system release 2.0 (hereinafter Strata™ release 2.0) is a software based system which applies predictive modeling techniques to customer data, to thereby generate dramatic improvements in the effectiveness and profitability of customer interactions.

FIG. 1 is a diagram illustrating the general concept of a software-based decision management system, such as Strata™ release 2.0, which applies predictive modeling techniques to customer data.

Referring now to FIG. 1, a software based system 10 receives information from operational and/or customer information systems 20, such as, for example, billing systems, account management systems, credit bureau systems and data warehouses. Software based system 10 prioritizes and tailors customer interactions based on predictive information, specific business rules, and continually evolving decision strategies. Software based system 10 then determines an appropriate action which is to be taken by an action-taking system 30. An appropriate action to be taken could include, for example, a call to a customer, a specific collections procedure or a specific marketing action.

A decision management system as in FIG. 1 can provide superior results, such as increased revenue generation, improved cost-effectiveness and enhanced customer relationships.

FIG. 2 is a more detailed diagram illustrating the operation of the decision management system Strata™ release 2.0.

Referring now to FIG. 2, in step 40, an inbound event is a trigger that is received from one or more external systems to identify that a particular customer event has occurred. Such events may be automatically generated due to customer behavior or systematically produced at specified time intervals (i.e., monthly). Examples of inbound events include a customer declaring bankruptcy, a credit underwriting decision request, a credit account delinquency, an income statement cycle date, or a routine evaluation date (a periodic, scheduled evaluation).

From step 40, the system moves to step 50, where a customer is assigned to a segment. A segment is a grouping of customers based on a characteristic by which the customers will be separated for applying different rules. Generally, a segment is a high level segregation of customers for the purpose of associating largely independent high level strategy. Segments are completely separate groups of customers, for which a unique set of evaluation processes have been defined. For example, a telecommunications company might have a segment for residential customers and another for business customers.

From step 50, the system moves to step 60, where customers are randomly grouped into different test groups for the purpose of applying competing policy rules, strategy, or experiments. Generally, test groups allow for strategy comparison. Just as in research environments, the behavior or outcomes of an experimental "test" population is compared to that of a "control" group that is not exposed to the experimental treatment. A strategist can specify what percentage of the customers should be randomly assigned to each test group. If the strategy associated with a test group is successful, that strategy may later be deployed to a larger percentage of the customers.

From step 60, the system moves to step 70, where inbound events are matched to processes. More specifically, it is defined which processes are invoked in response to each inbound event. For example, different processes are created for a credit card campaign versus a late payment. The order of process execution is also specified.

Processes can be seen as individual decision logic modules which are invoked in response to inbound events. This modular approach to defining decision strategies facilitates logic re-use and the ability to deploy robust strategies required to coordinate customer, account and marketing decisions.

From step 70, the system moves to step 80, where the specific processes for specific inbound events coming into the system are executed.

From step 80, the system moves to step 90, where the results, or action to be taken, are output.

Therefore, in FIG. 2, based on the type of inbound event(s) received, an appropriate sequence of decision logic modules, or processes, is invoked, where the sequence of decision logic modules is predefined by a strategy analyst.

FIG. 3 is a diagram illustrating an example of a segment being divided into different test groups as in step 60 of FIG. 2. Referring now to FIG. 3, 10% of the segment is randomly assigned to test group 1, 10% of the segment is randomly assigned to test group 2, and 80% of the segment is randomly assigned to test group 3.

FIGS. 4(A) and 4(B) are diagrams illustrating the matching of inbound events to processes in step 70 of FIG. 2. Referring now to FIG. 4(A), for example, when an inbound event 91 is a credit card campaign, the following processes are applied, in order: credit card propensity to buy score 92, risk score 93 and offer selection 94. A result 95 of the applied processes is a determination of whether to send a credit card offer.

Similarly, referring now to FIG. 4(B), for example, when an inbound event 96 is a late payment, the following processes are applied, in order: risk score 97, underwriting treatment 98 and overdraft decision treatment 99. A result 100 of the applied processes is a determination whether to send new underwriting and overdraft codes.

Processes are decision logic modules formed by one or more "mechanisms". Mechanisms can be, for example, decision trees or score models. There are preferably several different mechanisms which are available in the creation of any process. One or more mechanisms are typically grouped into processes when they have comparable objectives (i.e., score cards to predict risk, decision trees to evaluate a credit line, etc.). Generally, the objective is typically reflected in the name of the process itself as defined by the user.

In this conventional decision management system, only a single set of variables is defined. This single set of variables is written over and used for each process. Subsequent processes write over the data stored in the variables from the previous process. For example, referring to FIG. 4, once a risk score is computed by risk score 93, this risk score is stored into a variable which may have stored a score computed by credit card propensity to buy score 92. Thus, the results of the processes are written over each other into the same set of variables. In this manner, the decision management system has a forced dependency between processes.

FIG. 5 is a diagram illustrating the grouping of mechanisms to processes. Referring now to FIG. 5, when an inbound event 91 triggers a specific process, the specific mechanism to be applied to a customer will be determined by the test group into which the customer was assigned. This allows for strategy experimentation by defining a common sequence of processes for a given inbound event, but differentiating the actual mechanism that will be invoked for each process depending on the respective test group into which the customer was randomly assigned.

If a process only contains one mechanism, no experimentation will take place in that process since every customer, regardless of its test group, will be required to use the mechanism. For example, in FIG. 5, no experimentation takes place in the credit card propensity to buy score 92, since this process contains only one mechanism. By contrast, in FIG. 5, experimentation takes place in offer selection 94, since this process includes more than one mechanism. This approach provides the strategy analyst with the flexibility to selectively experiment on each component of the overall strategy, as appropriate.

Processes can include many different types of mechanisms, including decision trees, score models and matrices. Decision trees are the most common.

FIG. 6 is a diagram illustrating a decision tree. A decision tree employs pre-defined logic to route customers to the appropriate endpoint. Generally, a decision tree contains layers of rule-driven decision points, or nodes (starting with a root node at the top of the tree), from which customers are allocated to lower and lower branches of a tree until they ultimately reach an endpoint of the tree (a terminal node). Because decision trees can vary in structure (e.g., number of branches, nodes per branch) and because decision trees can call other decision trees, decision trees provide extensive flexibility for designing customer strategies.

Unfortunately, with a conventional decision management system executing customer level policy, a separate decision tree must be designed for each account, regardless of the type of the account. Thus, the same decision tree can not be applied against multiple accounts for the same customer.

For example, FIG. 7 is a diagram illustrating a conventional decision tree for a specific credit card, referred to as credit card #1, of a customer. Referring now to FIG. 7, a conventional decision tree has specific decisions set forth for the specific credit card. For example, in step 105, the system follows a different path through the decision tree based on whether the customer a high risk or a low risk customer. If the customer is a high risk customer, the process moves to step 110, where the balance of credit card #1 is determined. If the balance is between 0-500, then decision D1 is made. If the balance is between 501-MAX, then decision D2 is made. For example, decision D1 may be to cancel the credit card account, and decision D2 may be to increase the interest rate on the credit card account.

By contrast, in step 105, if the customer is a low risk customer, the process moves to step 120, where the credit limit of credit card #1 is determined. If the credit limit is between 0-500, then decision D3 is made. If the credit limit is between 501-MAX, then decision D4 is made. For example, decision D3 may be to increase the credit limit of the credit card account, and decision D4 may be to reduce the interest rate of the credit card account.

The determination of whether each customer is a high risk or a low risk customer is made before step 105 is executed, and the results of the determinations are stored in the system memory. Therefore, step 105 does not make the determination of whether the customer is a high risk or low risk customer, but simply retrieves the previously made determination from the system memory.

While the decision tree in FIG. 7 may be effective in designing a strategy for credit card #1, such an approach requires a separate decision tree to be created for each account, regardless of the type of account, when processing at the customer level. For example, if a customer has three credit card accounts, then a separate decision tree must be created for each credit card account. As a result, three separate decision trees must be created, each referencing the data of a specific account. Similarly, for example, if the customer has two or more mortgages account, then a separate decision tree must be created for each respective mortgage account.

As can be seen from above, a conventional decision management system will require a different decision tree for each of a customer's accounts. Thus, the decision management system must get data for a specific account, and then perform an evaluation for that account. The decision management system must then get data for the next account, and then perform an evaluation for that account. This repeating operation of retrieving data and performing evaluations is referred to as a "multi-pass" operation. Such a multi-pass operation greatly increases the complexity and reduces the efficiency of the system, especially when customers tend to have many accounts of the same type.

Similarly, since a conventional decision management system does not have the ability to define a mechanism without referencing a specific account (versus a type of account), maintenance of the strategy will be substantially increased. Simultaneous customer and account evaluation would not be feasible if each customer could have a different number of accounts.

SUMMARY OF THE INVENTION

Therefore, it is an object of the present invention to provide a decision management system which can support simultaneous and interchangeable customer and account evaluation, particularly when the type and number of accounts could vary by customer.

In addition, it is an object of the present invention to provide a decision management system which reduces the number of required decision trees for the various different accounts, thereby reducing the complexity and increasing the efficiency and effectiveness of the system.

Additional objects and advantages of the invention will be set forth in part in the description which follows, and, in part, will be obvious from the description, or may be learned by practice of the invention.

Objects of the present invention are achieved by providing a computer-implemented decision management process for evaluating a customer having more than one account. The process, in a single pass, evaluates the customer and each of the accounts.

Objects of the present invention are also achieved by providing a computer-implemented decision management process which uses an iterative function to evaluate the customer and each of the accounts. The iterative function has virtual attributes for accessing and referencing data associated with multiple customers and/or accounts. The process iterates through the iterative function in accordance with the number of customers/accounts. The iterative function can be, for example, an iterative decision tree, an iterative matrix, an iterative score model, an iterative list processor or an iterative user exit.

BRIEF DESCRIPTION OF THE DRAWINGS

Reference will now be made in detail to the present preferred embodiments of the present invention, examples of which are illustrated in the accompanying drawings, wherein like reference numerals refer to like elements throughout.

DESCRIPTION OF THE PREFERRED EMBODIMENTS

Figure 1:
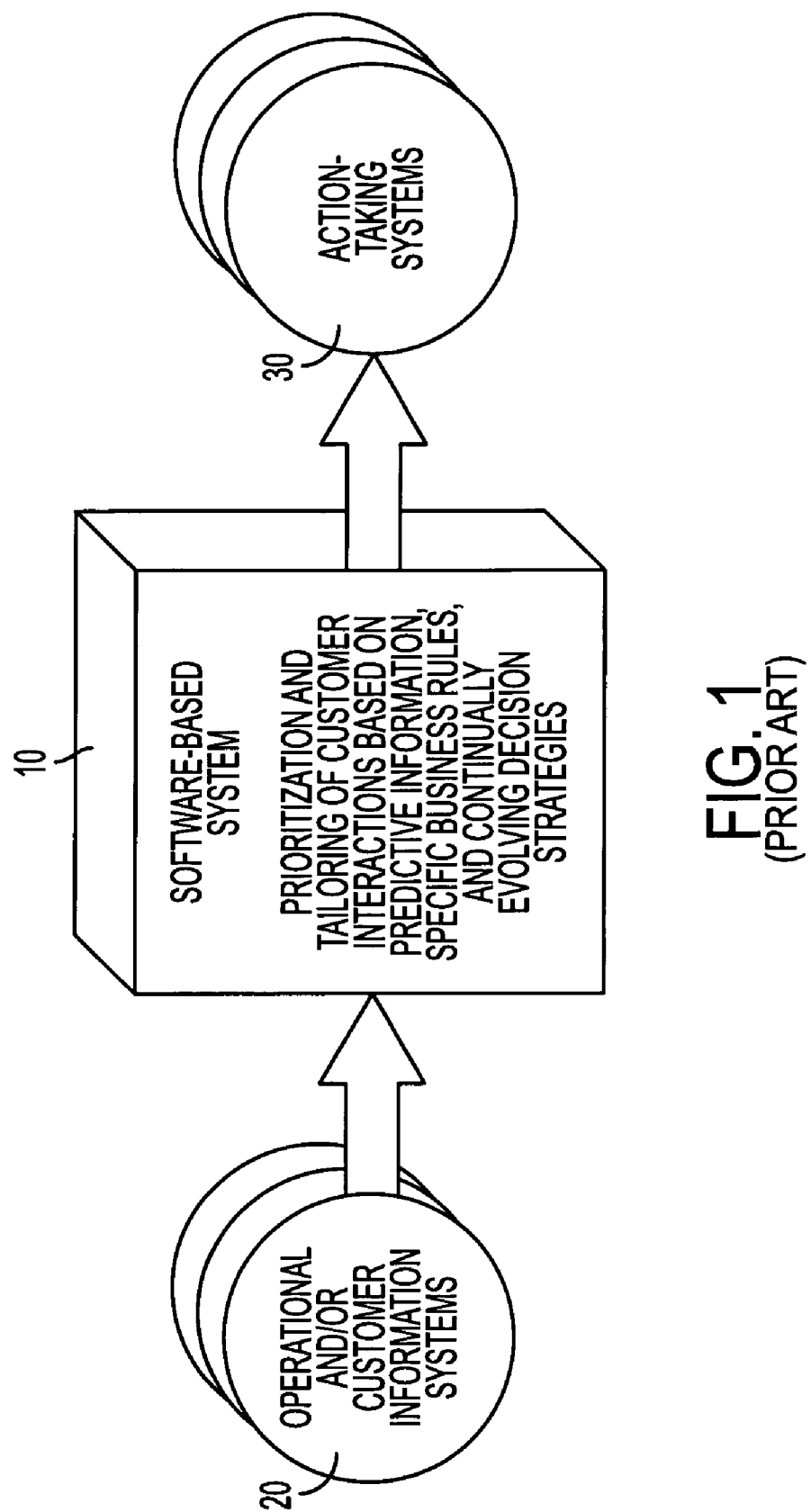
FIG. 1 (prior art) is a diagram illustrating the general concept of a software-based decision management system which applies predictive modeling techniques to customer data.

Reference will now be made in detail to the present preferred embodiments of the present invention, examples of which are illustrated in the accompanying drawings, wherein like reference numerals refer to like elements throughout.

Figure 8:
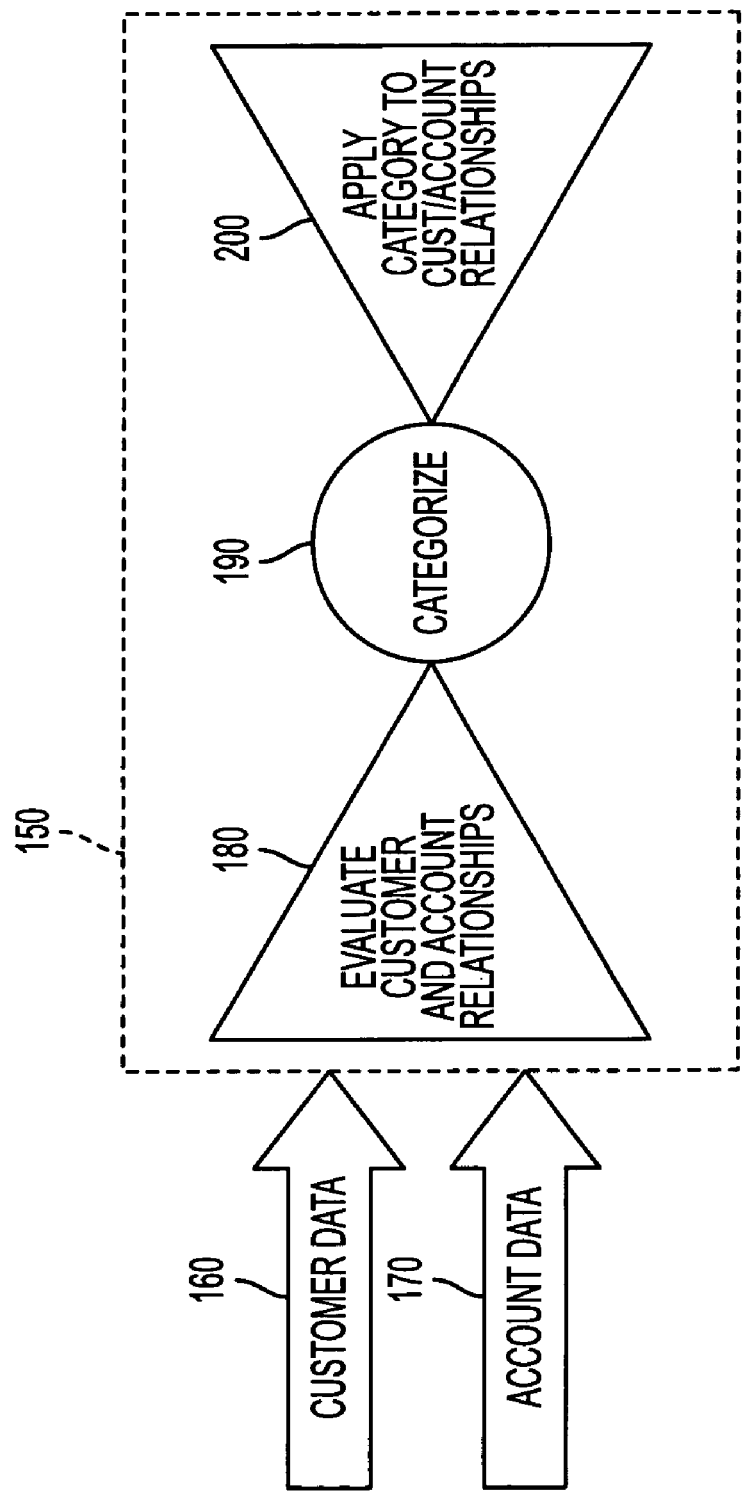
FIG. 8 is a diagram illustrating the overall logical operation of a decision management system, according to an embodiment of the present invention.

FIG. 8 is a diagram illustrating the overall logical operation of a decision management system, according to an embodiment of the present invention. Referring now to FIG. 8, the decision management system 150 receives extracts 160 and 170, which are essentially data feeds providing data. More specifically, extract 160 provides customer data, which is data relating to information at the customer level. Such customer data could include, for example, data indicating demographic information, or data indicating the number of accounts held by a specific customer. Extract 170 provides account data, which is data relating to specific accounts. Such account data could include, for example, balance and credit limit information about a specific credit card account of a specific customer. While extract 170 is shown as being a single extract, extract 170 can actually be a plurality of individual extracts which each provides customer and/or account data. For example, extract 170 could actually represent three separate extracts, where one extract provides credit card data, one extract provides savings account data, and one extract provides mortgage account data.

Therefore, a customer can have many different types of accounts, and many different accounts of the same type. For example, different types of accounts can include credit card accounts, mortgage accounts, long distance telephone accounts, cellular telephone accounts and cable TV accounts. A customer can have, for example, three different credit card accounts, or two different cellular telephone accounts. Data regarding the customer and the accounts is provided to decision management system 150 by extracts 160 and 170. Different types of data can be provided on different extracts.

Therefore, data may not always be coming from the same place, and the data must be passed to decision management system 150 from multiple sources at both the customer and account level. As a result, decision management system 150 supports multiple extracts, or multiple "feeds" of data, from various sources. Decision management system 150 can link these feeds together when they relate to a common entity, such as customer.

In step 180, decision management system 150 evaluates customer and account relationships based on the customer and account data received on extracts 160 and 170. At this time, all customer information of a respective customer and, if necessary, all the individual accounts for that customer, can be evaluated. For example, the various customers can be matched to the various accounts, and various evaluations can be made. Such evaluations can include a determination of how many times a specific customer has been delinquent across all accounts, a determination of the relative risk of default of the customer on various accounts, a determination of the relative profitability of the customer to the organization. There are, of course, many different evaluations which could be performed in step 180, depending on the needs and objectives of the organization.

From step 180, the system may move to step 190, where customers are categorized. More specifically, a customer is determined to be in a specific category based on the evaluations performed in step 180. Here, a category is a grouping of customers as defined by the organization such that it aligns their customer interaction/value management objectives. In other words, categories represent groups of customers based on how the organization views and "treats" the customers. For example, a bank may divide customers (such as credit card holders) into the categories of Bronze, Gold, and Platinum, based on how the bank views the credit worthiness of the customers. Here, a category can be defined by a group of different criteria. For example, a Platinum category can include only customers having a low current value, a high future value, a low risk, an average propensity to leave, and a high propensity to buy more than one product.

From step 190, the system moves to step 200, wherein the categories are applied to the various accounts, and appropriate actions are taken to each account. For example, if a customer is determined to be in the Platinum category, all fees will be waived for each of that customer's checking accounts that have direct deposit, and no minimum balance will be required for all of that customer's savings accounts. By contrast, for example, if the customer is determined to be in a Gold category, the credit limit will be increased by 5% for all that customer's credit card accounts, and the minimum balance will be reduced by 5% for all that customer's savings accounts. Moreover, the decision management system is not intended to be limited for use in any specific industry, so the above examples should not be taken as limiting examples. For example, when the decision management system is used in the telecommunications industry, if a customer is determined to be in a certain category, roaming fees could be waived for all of that customer's cellular phone accounts, and a discount could be applied to all of that customer's long distance or residential telephone accounts.

Therefore, in step 190, a single strategy is applied against all accounts of the same type. For example, the same strategy (for example, waiving all fees) is applied to all accounts of the same type (for example, to all the checking accounts of a specific customer). As a result, it is not necessary to build a separate strategy for each different account of the same type. For example, it is not necessary to build a separate strategy for different credit card accounts of the same customer. This single strategy approach for all accounts of the same type is successful since, generally, accounts of the same type have a high degree of correlation or overlap. For example, different credit card accounts will have similar data to be used in developing the credit card strategy.

As an additional example, assume that a customer includes the following five types of accounts: credit card accounts, savings accounts, mortgage accounts, checking accounts, and line of credit accounts. For each of these different types of accounts, an appropriate action can be taken, based on the category of the customer. Here, a single strategy is applied to each account of the same type.

In FIG. 8, steps 180, 190 and 200 are defined by the system analyst. Moreover, FIG. 8 is intended to represent only one example of a strategy using customer and account data. The example in FIG. 8 is a typical example, but not mandatory, and there are other ways that customer/account data may be used.

As will be discussed in more detail below, the single strategy is typically defined by a decision tree in conjunction with other functions (such as matrices, outbound events). Therefore, this single strategy, or decision tree, can simply be defined once and then reiterated through for each of the different accounts of the same type. As a result, in a single pass, all customer and account data can be analyzed and appropriate action can be taken.

Here, a single pass indicates that, in the evaluation of a customer, the required customer and account data is retrieved and loaded into the decision management system once, prior to doing the customer evaluation. After the data is loaded, customer and account rules can be run interactively and interchangeably against the data. This is particularly important where a respective customer has many accounts. Thus, the system does not have to run multiple times with dependencies between previous and subsequent occurrences. More specifically, each account does not have to be run through the system individually prior to performing customer level processing. Similarly, accounts do not have to be individually run through the system after customer processing is complete (i.e., to perform step 200 in FIG. 8).

Figure 7:
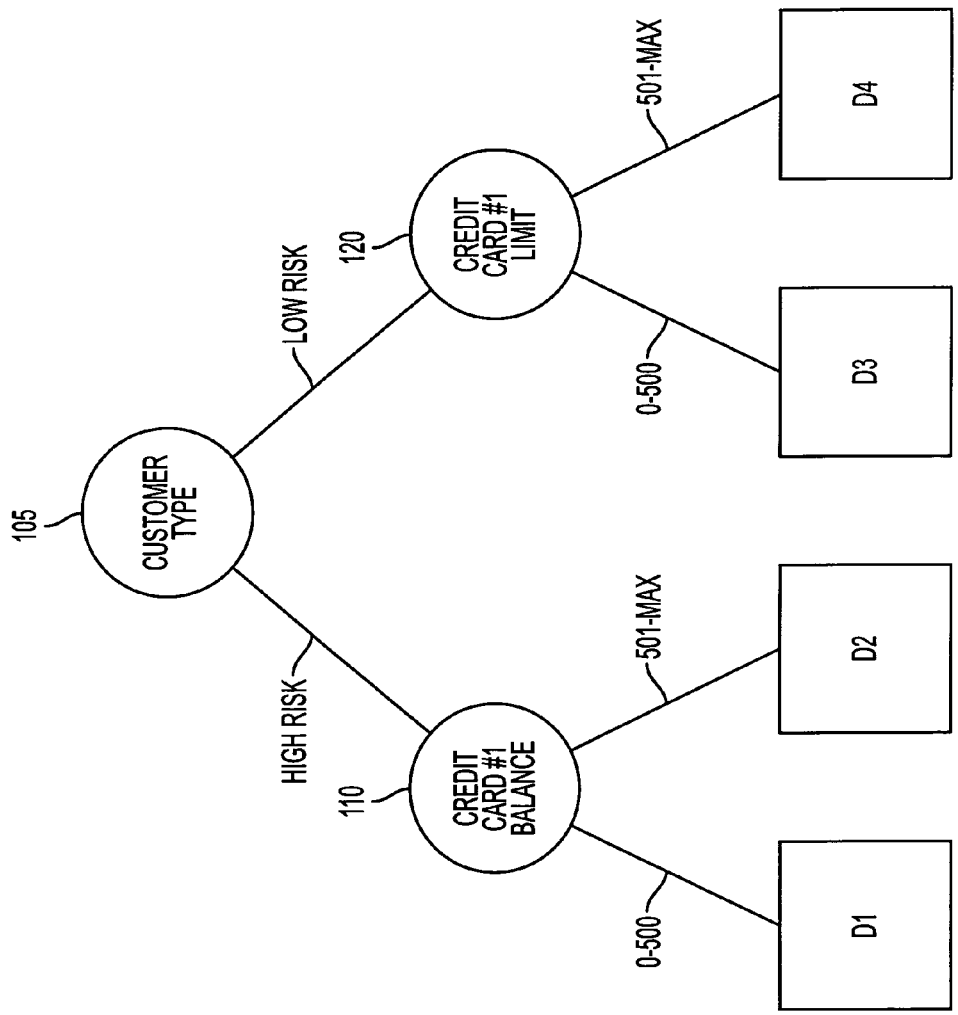
FIG. 7 (prior art) is a diagram illustrating a decision tree for a specific account.

This single pass operation is significantly different than the multi-pass operation in FIG. 7. More specifically, to summarize, a single pass operation, as in the present invention, can been seen as a looping process. By contrast, a multi-pass operation, as in FIG. 7, can be seen as the execution of multiple, single operations. The concepts of single pass and multi-pass would be understood by persons of skill in the art.

Virtual attributes are used to apply the same strategy to the different accounts of the same type. Here, an attribute is any data element passed into decision management system 150 from an external source/system or created by decision management system 150 as a result of executing a strategy. A virtual attribute is a single attribute that has no explicit data value associated with it, but rather points to an array, or collection, of attributes.

For example, for every account type, the maximum number of accounts a customer can have may be known. A virtual attribute, such as BALANC( ) to indicate the balance of an account, can then have a number of iterations associated with the maximum number of accounts. For example, if the maximum number of allowed credit card accounts is ten, then the maximum number of possible iterations of BALANC( ) can be set to ten.

When creating a virtual attribute, the location of the first value for the virtual attribute should be set. For example, the specific extract and the location of the first value on that extract should be determined. The location of the other values can then typically be determined by their relative locations with respect to the first value. If all values are contiguous on the same extract, than it is easy to find the other values. For example, if values for credit card accounts 1 through 10 are all contiguous on the same extract, decision management system 150 can easily determine the starting position of the value for each credit card account. Such a contiguous arrangement of values often provide a simple, efficient manner of accessing data, and may therefore improve overall performance of decision management system 150. However, the arrangement of values is not intended to be limited to any specific arrangement, or even on the same extract. Instead, values can be arranged in many different orders, and can be on different extracts. Thus, there are may different ways to "map" a virtual attribute to the location of the data.

Virtual attributes can be used in many different functions to define strategy. Such functions are typically iterative decision trees or iterative matrices, examples of which will be shown in further detail below.

For example, a virtual attribute might be BALANC( ). This virtual attribute can be defined as having three occurrences: BALANC01, BALANC02 and BALANC03. Three instances of the virtual attribute are thus created and referenced by BALANC( ) such that a separate value can be associated with each occurrence.

An iterative decision tree can then be defined using BALANC( ) as an attribute at a given node. The iterative decision tree will be executed three times, each time incrementing the iteration and retrieving the respective value associated with BALANC01, BALANC02 or BALANC03, depending on the iteration. This allows a strategy to be defined once, but repeatedly executed for each of the customer's accounts.

To continue the example, using virtual attributes, an iterative decision tree can be designed that checks the balance of all three credit cards for a given customer and makes a customer-level decision as to the customer's current value based on the balance carried on each of the three cards. This enables the simultaneous assessment and execution of account and customer data without having to independently execute a decision engine for each credit card followed by an additional execution of the decision engine to evaluate the customer (that is, taking four passes to reach the same decision).

When a virtual attribute is defined, a specific account can easily be individually accessed. For example, assume that BALANC( ) is defined as a virtual attribute for a credit card balance, and that it is known that there are ten credit card accounts. Therefore, the value for the credit card balance for the fifth credit card can easily be individually accessed, by accessing BALANC05.

Figure 9:
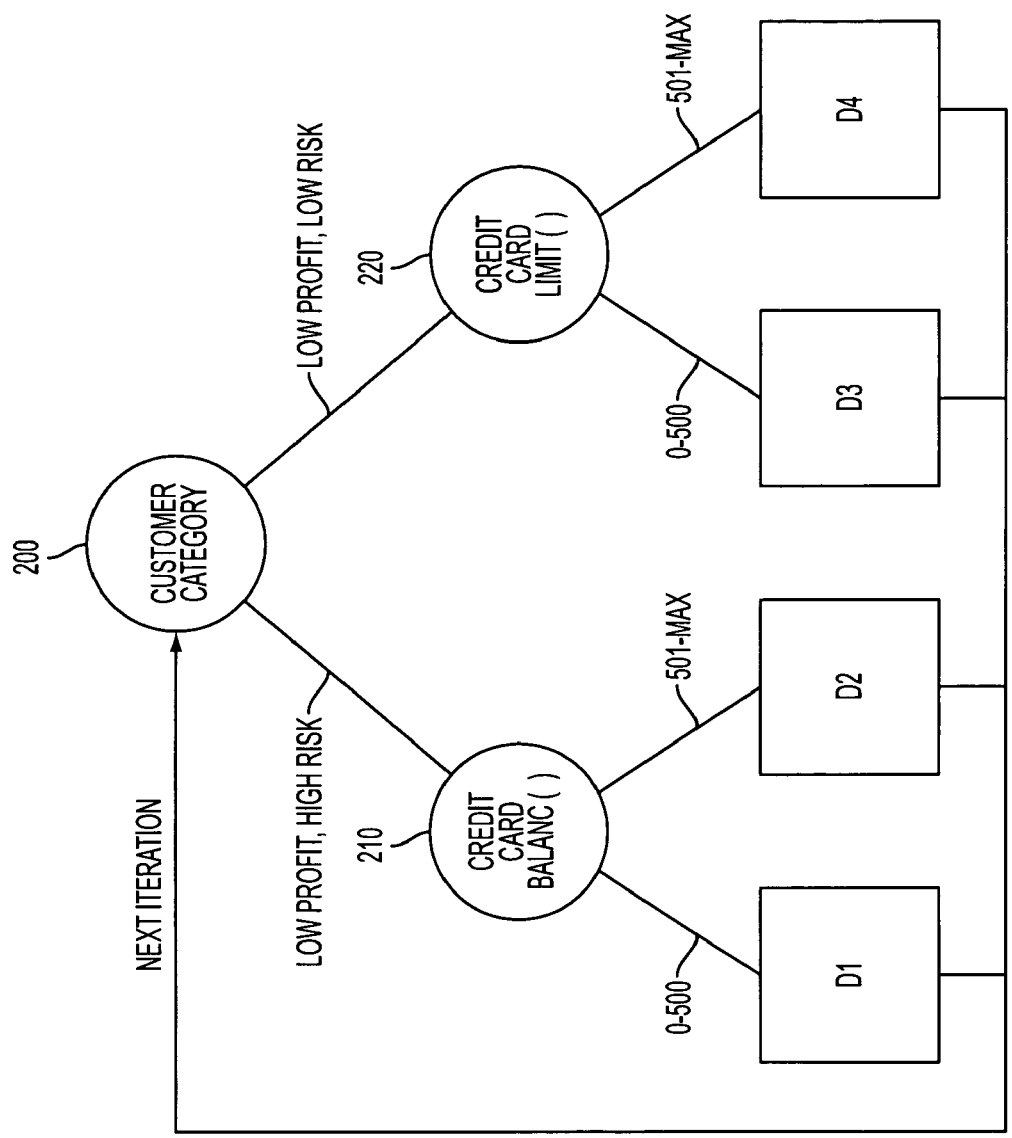
FIG. 9 is a diagram illustrating an example of an iterative decision tree using virtual attributes, according to an embodiment of the present invention.

FIG. 9 is a diagram illustrating an example of an iterative decision tree using virtual attributes, according to an embodiment of the present invention. Referring now to FIG. 9, the decision tree has specific decisions set forth for the specific credit card, based on the iteration for virtual attributes. For example, in step 200, it is determined whether the customer a low profit, high risk customer, or a low profit, low risk customer. If the customer is a low profit, high risk customer, the process moves to step 210, where, for the first iteration, the balance of credit card #1 is determined. If the balance is between 0-500, then decision D1 is made. If the balance is between 501-MAX, then decision D2 is made.

By contrast, in step 200, if the customer is a low profit, low risk customer, the process moves to step 220, where, for the first iteration, the credit limit of credit card #1 is determined. If the credit limit is between 0-500, then decision D3 is made. If the credit limit is between 501-MAX, then decision D4 is made.

Moreover, the various decision, such as D1, D2, D3 and D4 in FIG. 9, can refer to matrices or other structures which use virtual attributes. For example, decision D4 may be to reduce the interest rate of the credit card account. To determine the amount of the reduction, decision D4 might refer to a Limit Adjustment Amount matrix having virtual attributes. In this case, for the first iteration, decision D4 would access the matrix in accordance with virtual attributes for the first iteration.

After a decision is made for the first iteration, the iteration number is increased by one, the decision tree is executed for the second iteration, to thereby make a decision for the second credit card account. The decision tree is then reiterated through for each credit card account, so that a decision is made for each account. In this manner, a single decision tree is designed and reiterated through for each account of the same type. This approach is significantly different than that in FIG. 7, where an individual decision tree must be designed for each account, even though the accounts are of the same type, because the data for each account must be referenced "specifically" rather than "generally" through virtual attributes.

Figure 10:
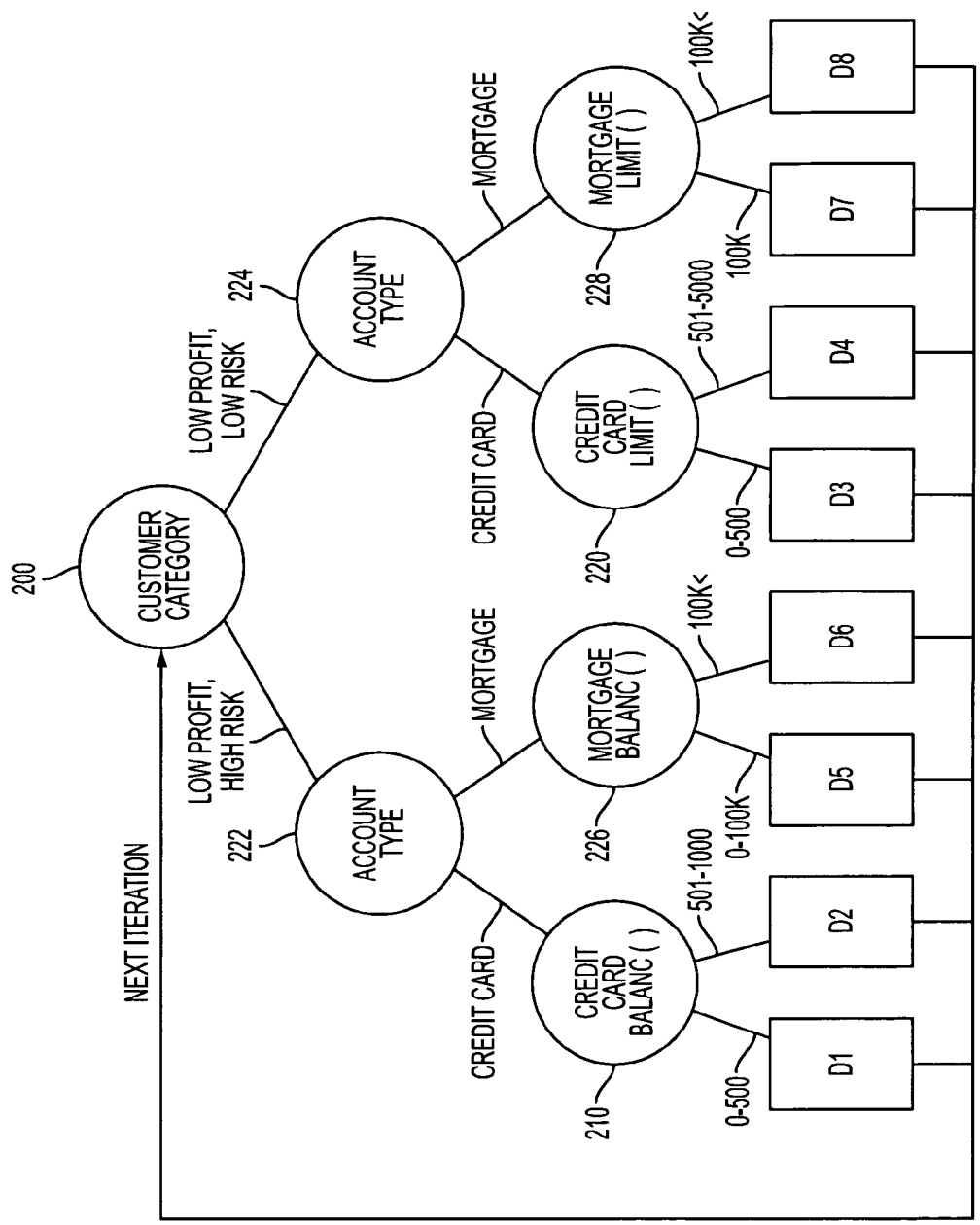
FIG. 10 is a diagram illustrating an additional example of an iterative decision tree using virtual attributes, according to an embodiment of the present invention.

FIG. 10 is a diagram illustrating an additional example of an iterative decision tree using virtual attributes, according to an embodiment of the present invention. FIG. 10 is similar to that in FIG. 9, but has been modified so that the type of account is considered, and then appropriate actions are taken based on the type of account. For example, referring now to FIG. 10, steps 222 and 224 are added to take into consideration the type of account. Thus, the iterative decision tree now takes into consideration whether the account is a credit card or a mortgage account. Steps 226 and 228 are added to provide appropriate decision paths based on the balance of a mortgage account. The iterative decision tree in FIG. 10 also includes decisions D5, D6, D7 and D8. Thus, FIG. 10 demonstrates how the present invention can also be used with multiple accounts of differing types.

The above-described "steps" taken in FIGS. 9 and 10 would be considered "nodes" of the iterative decision trees.

A virtual attribute can have its own properties. For example, a virtual attribute can have a maximum number of iterations. This maximum number would be a property of the virtual attribute. Similarly, an iterative decision tree can have its own properties. The iterative tree can be associated with an attribute that governs the number of iterations for each specific customer. For example, a customer may only have two accounts. Therefore, an attribute with the value "two" would be a property of the iterative decision tree.

Figure 2:
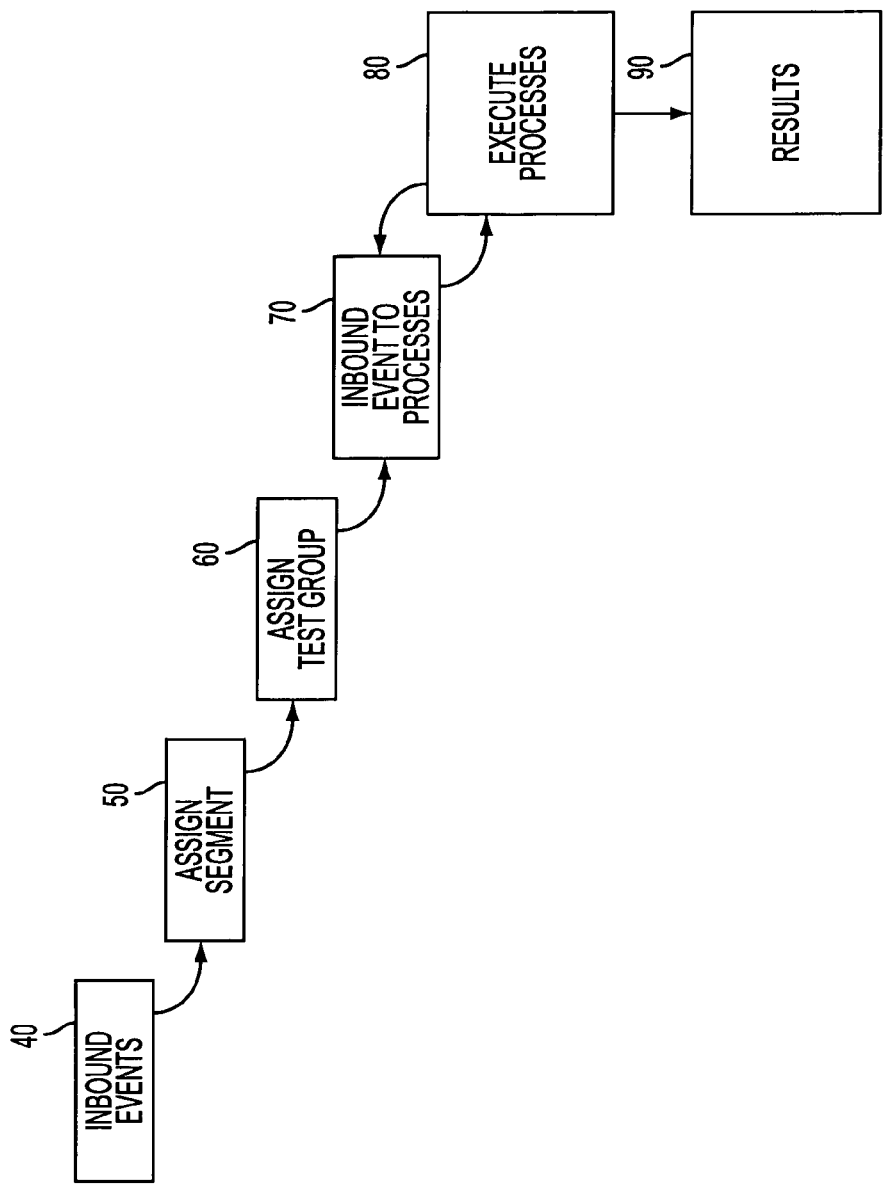
FIG. 2 (prior art) is a more detailed diagram illustrating the operation of a decision management system.
Figure 3:
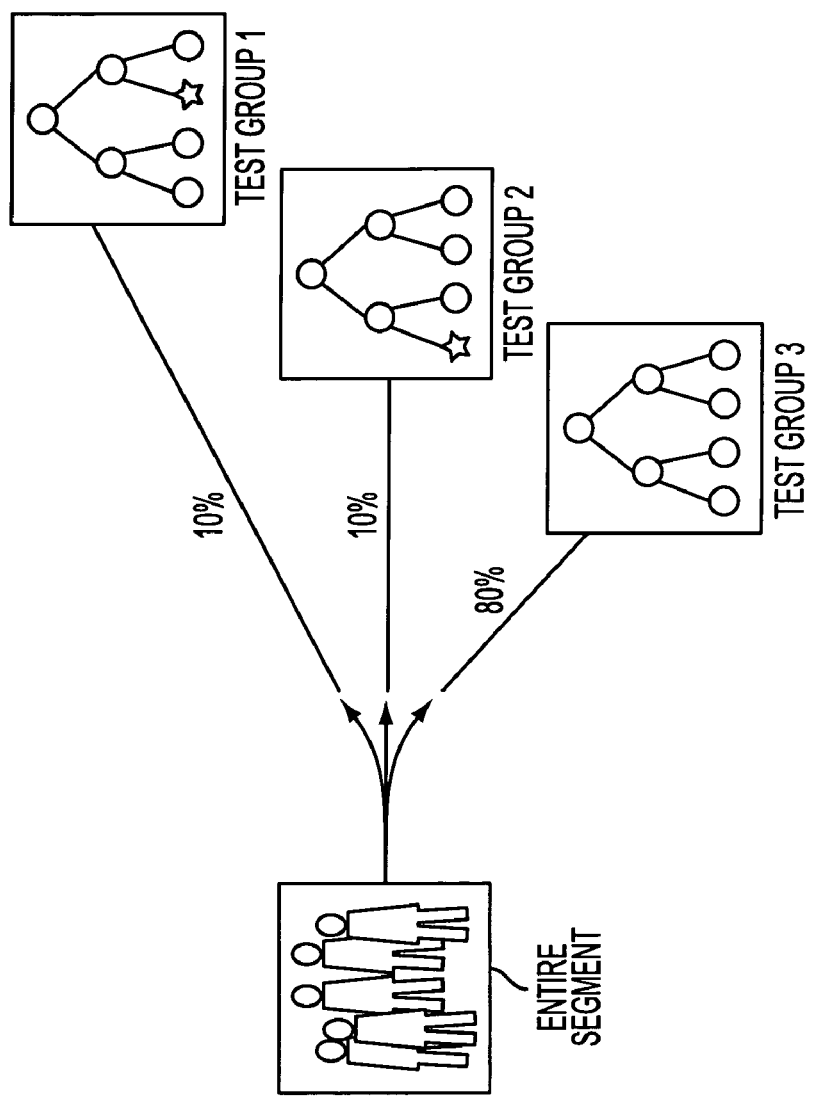
FIG. 3 (prior art) is a diagram illustrating an example of a segment being divided into different test groups in a decision management system.
Figure 4:
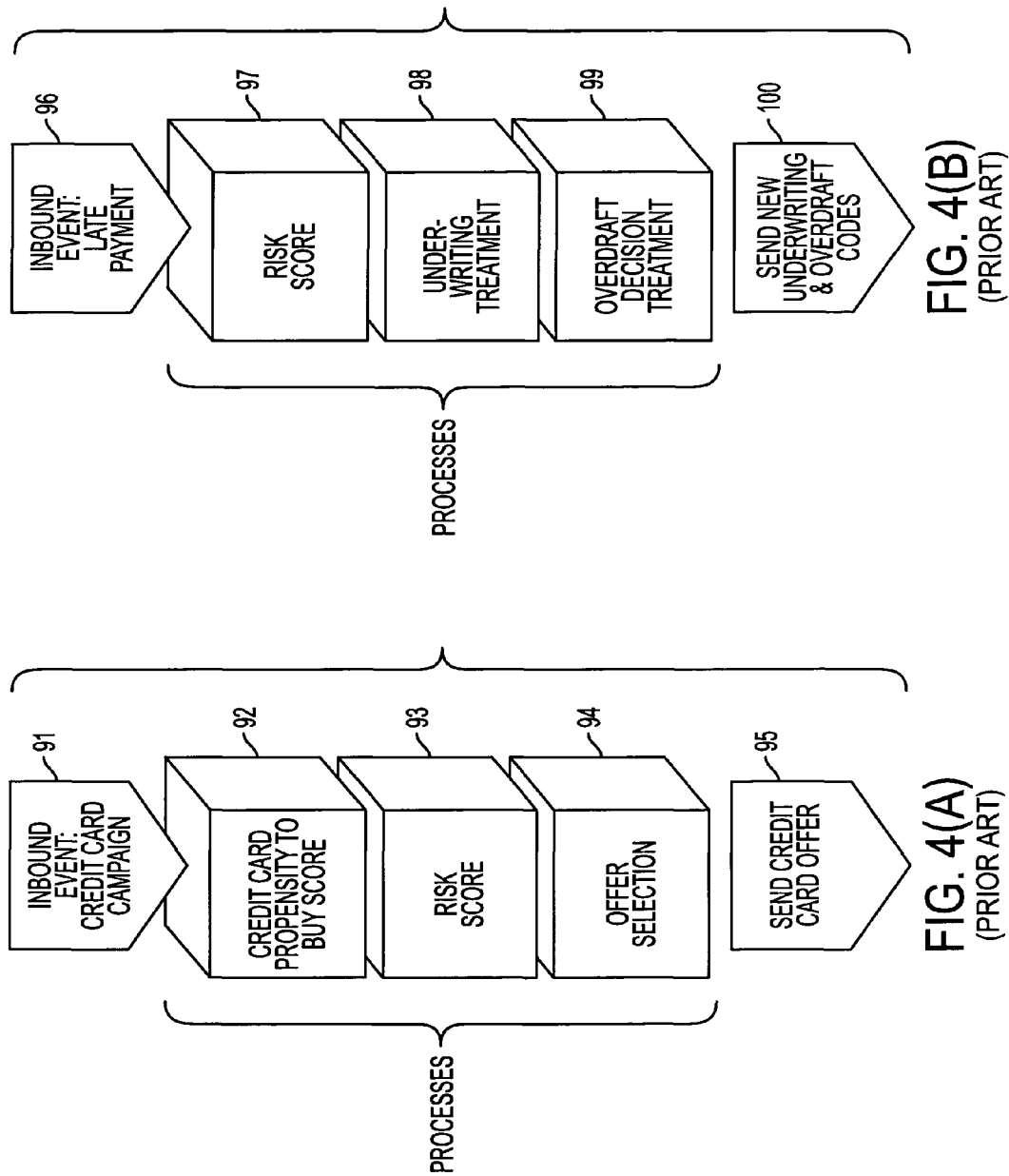
FIGS. 4(A) and 4(B) (prior art) are diagrams illustrating the matching of inbound events to processes in a decision management system.
Figure 5:
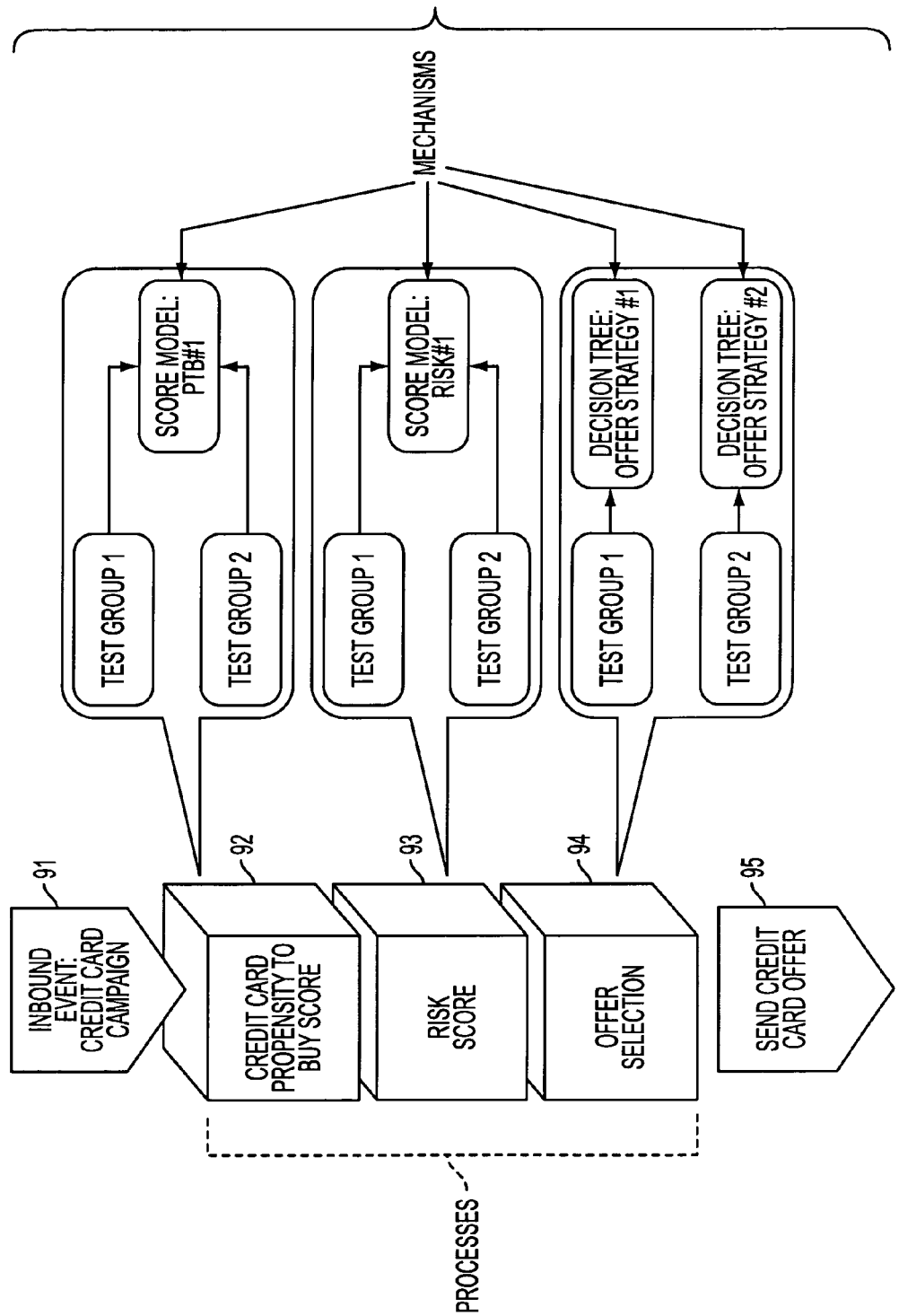
FIG. 5 (prior art) is a diagram illustrating the grouping of mechanisms to processes in a decision management system.
Figure 6:
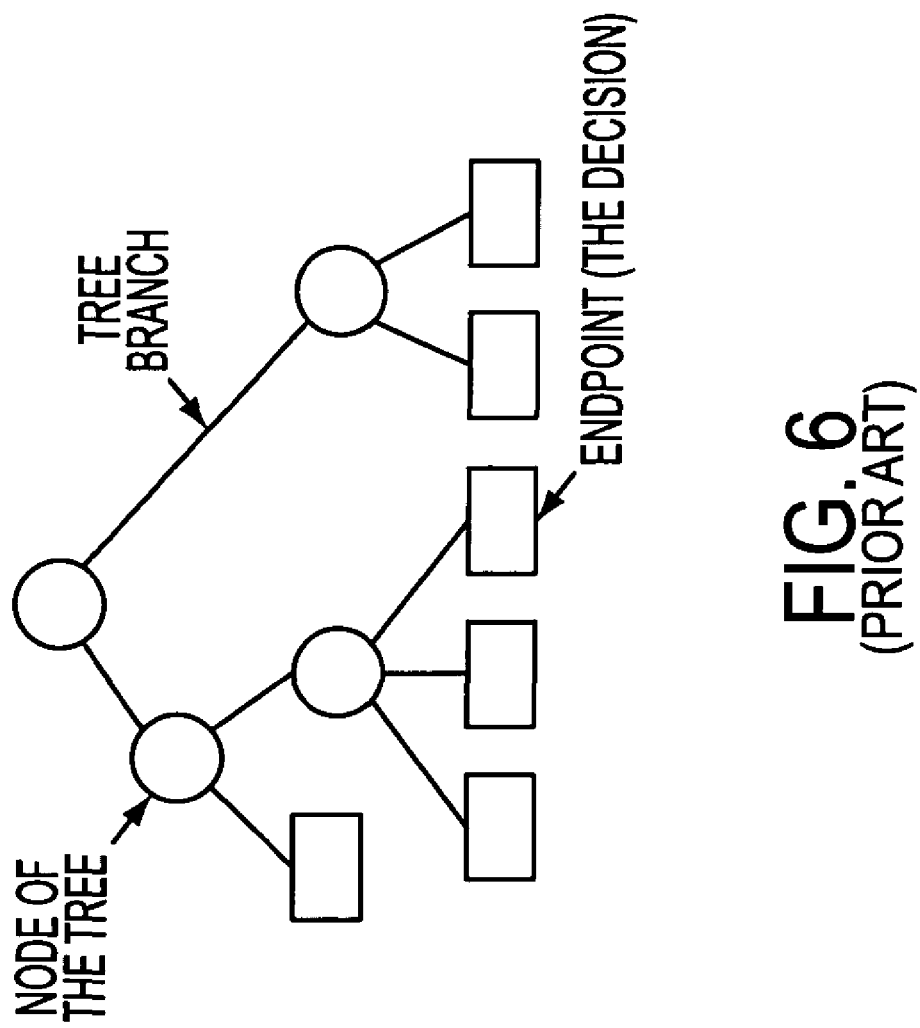
FIG. 6 (prior art) is a diagram illustrating a decision tree.

Iterative decision trees, or other such structures accessing virtual attributes, would typically be executed in step 80 of FIG. 2.

Figure 11:
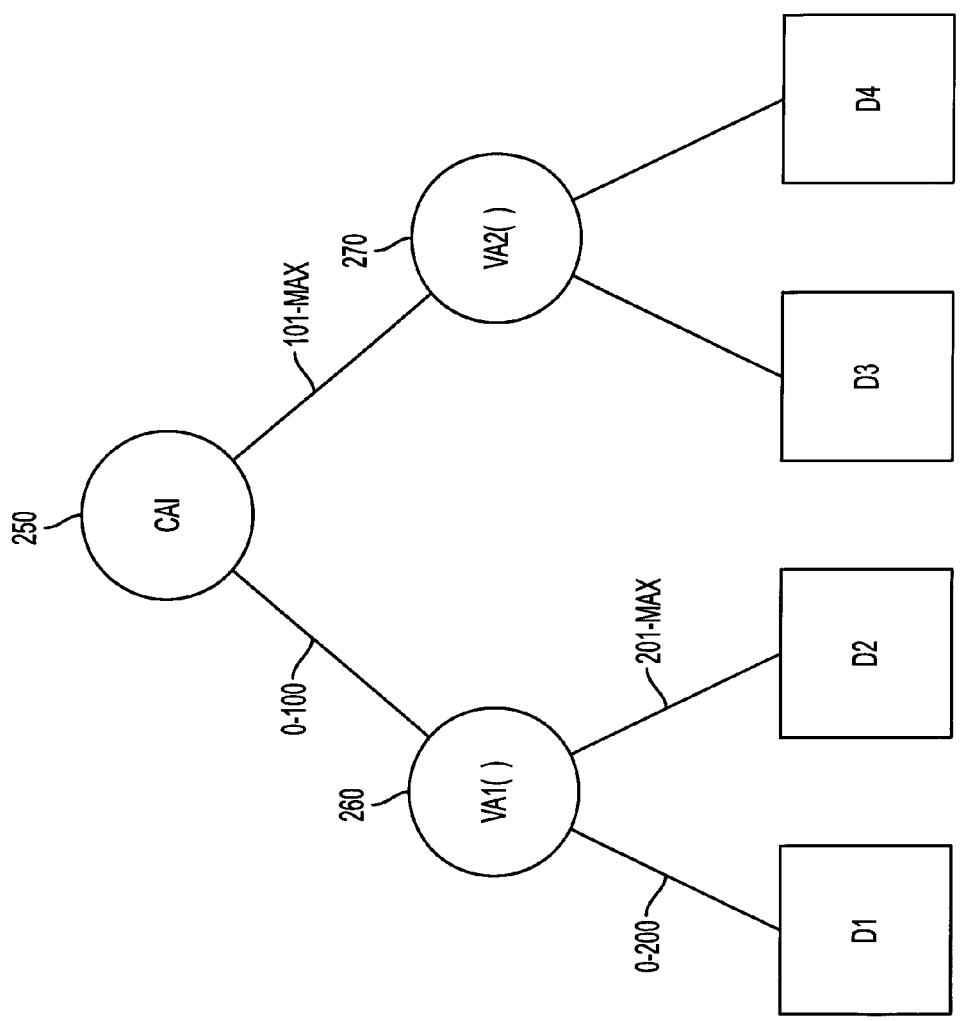
FIG. 11 is a diagram illustrating an iterative decision tree using virtual attributes, according to an embodiment of the present invention.
Figure 12:
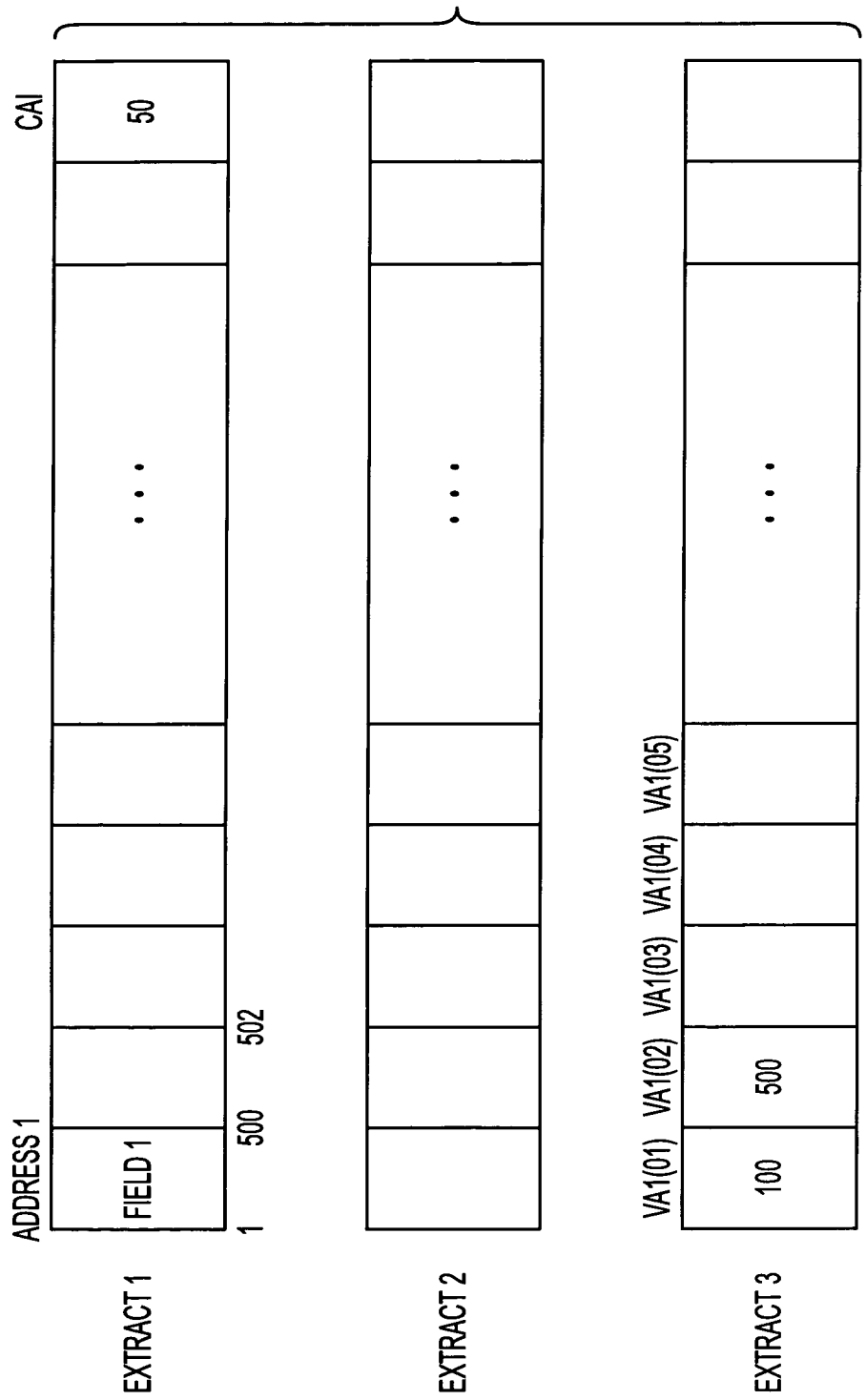
FIG. 12 is a diagram illustrating the storing of data on extracts for the virtual attributes used in the iterative decision tree of FIG. 11, according to an embodiment of the present invention.
Figure 13:
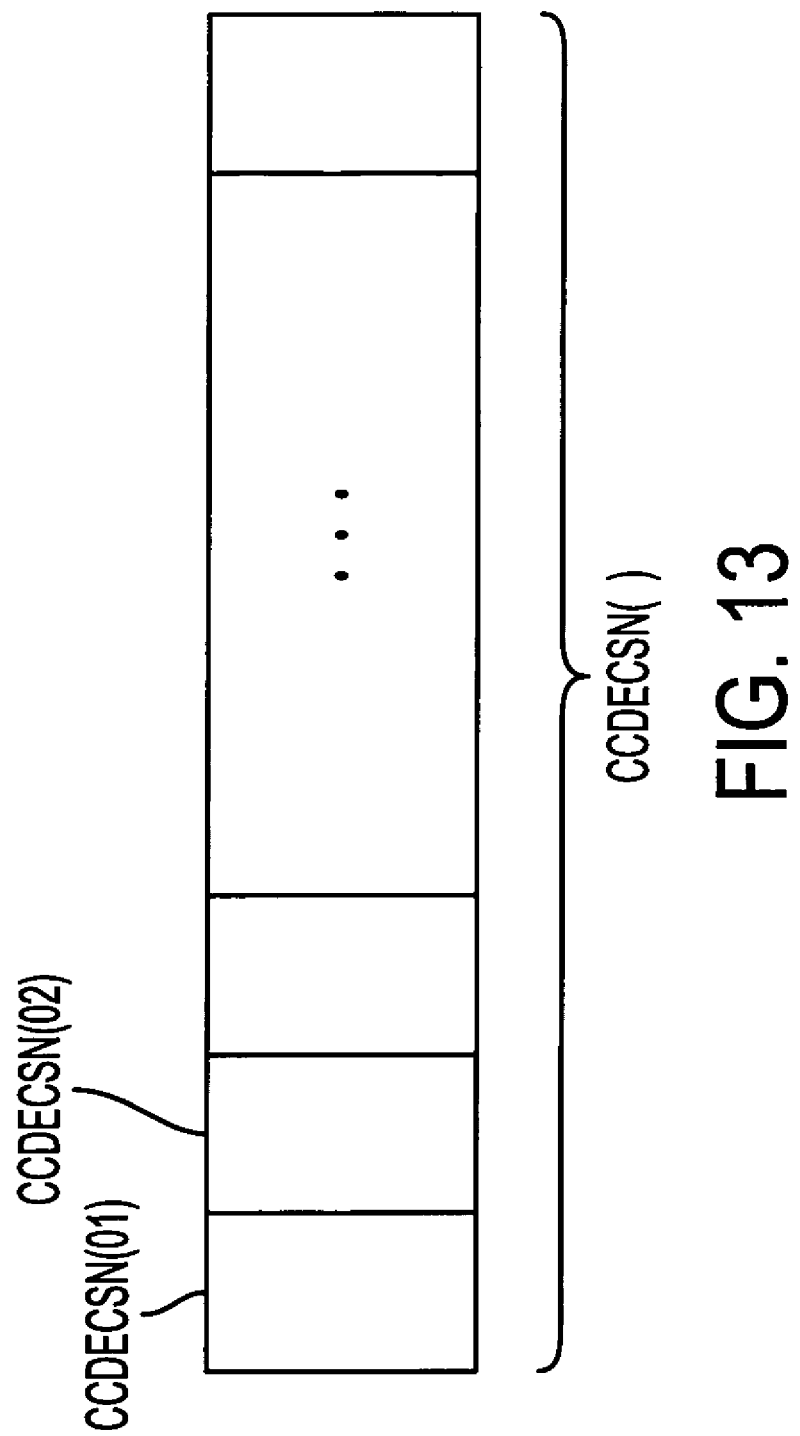
FIG. 13 is a diagram illustrating the storing of decision results as a virtual attribute in the iterative decision tree of FIG. 11, according to an embodiment of the present invention.
Figure 14:
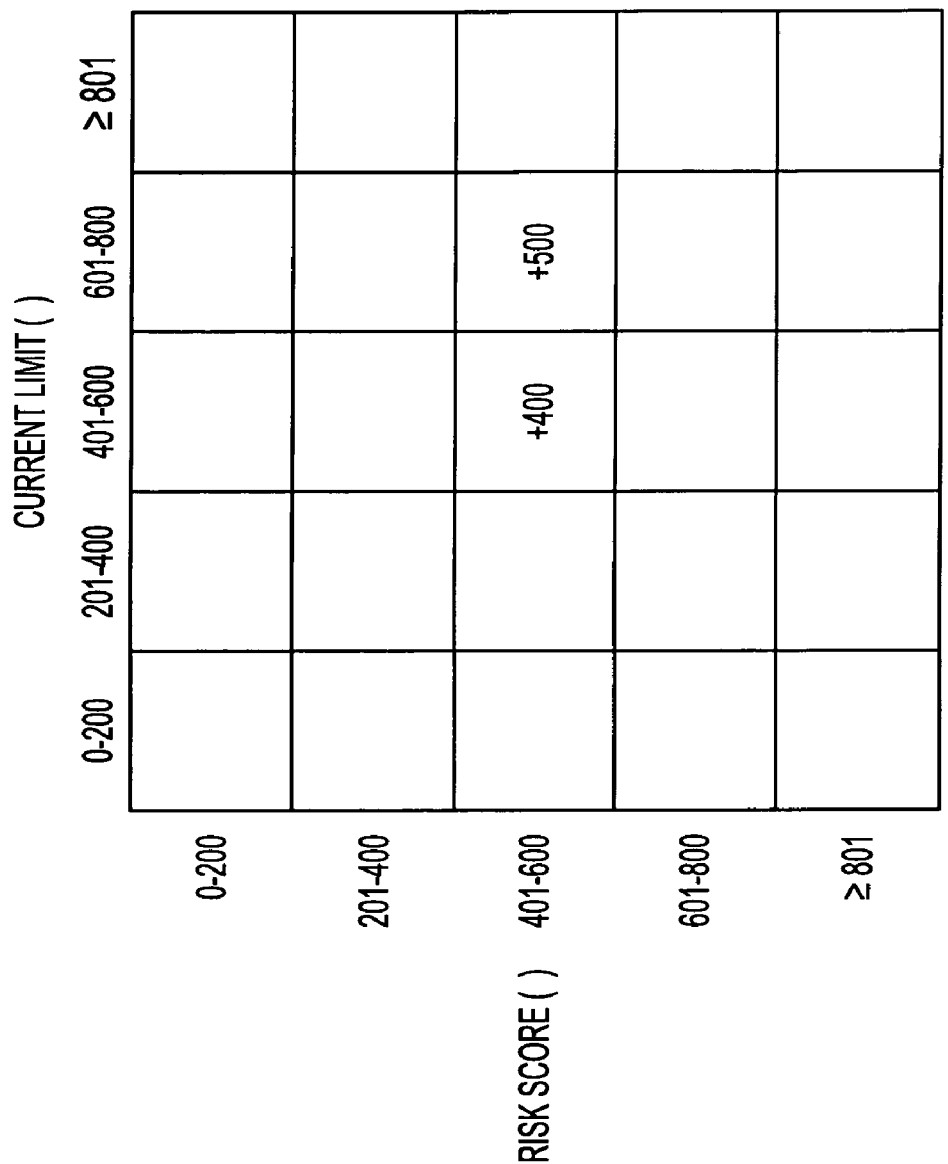
FIG. 14 is a diagram illustrating an iterative matrix triggered by a decision at a terminal node of the iterative decision tree in FIG. 11, according to an embodiment of the present invention.

FIGS. 11-14 are diagrams illustrating an example of the use of virtual attributes in a decision management system, according to an embodiment of the present invention. More specifically, FIG. 11 illustrates an iterative decision tree using virtual attributes. FIG. 12 illustrates the storing of data on extracts for the virtual attributes used in the iterative decision tree of FIG. 11. FIG. 13 illustrates the storing of decision results as a virtual attribute in association with the iterative decision tree of FIG. 11. FIG. 14 illustrates an iterative matrix triggered by a decision at a terminal node of the iterative decision tree in FIG. 11.

Referring now to FIG. 11, assume that CA refers to a customer attribute, and VA refers to a virtual attribute. Moreover, assume that the iteration is initially set to 1. In step 250 of FIG. 11, the decision management system retrieves customer attribute CA1 from the appropriate location on extract 1, as illustrated in FIG. 12. Thus, as illustrated in FIG. 12, the decision management system obtains the value 50 as CA 1 from the extract 1. This demonstrates that attributes which are not virtual can be used interchangeably with virtual attributes in the same iterative function.

Then, in FIG. 11, based on this value of CA1, the system moves to step 260, where the decision management system retrieves the value of the virtual attribute VA1( ) for the first iteration. Thus, as illustrated in FIG. 12, the decision management system obtains the value 100 as VA1(01) from extract 3.

Then, in FIG. 11, based on this value of VA1(01), the decision management system determines an appropriate action as dictated by decision D1. This determination can then be stored as the first iteration of a derived virtual attribute CCDECSN( ). More specifically, this determination is stored as CCDECSN(01) in the appropriate location as indicated in FIG. 13. Derived virtual attributes are virtual attributes whose value is derived through evaluation of a strategy, versus being passed in on an extract.

Then, the iteration number is increased, and the iterative decision tree in FIG. 11 is reiterated through again for the next iteration. For example, the iteration number is increased to 2. Then, in step 250 of FIG. 11, the decision management system retrieves customer attribute CA1 from the appropriate location on extract 1, as illustrated in FIG. 12. Thus, as illustrated in FIG. 12, the decision management system again obtains the value 50 as CA1 from the extract 1.

Then, in FIG. 11, based on this value of CA1, the system moves to step 260, where the decision management system retrieves the value of the virtual attribute VA1( ) for the second iteration. Thus, as illustrated in FIG. 12, the decision management system obtains the value 500 as VA1(02) from extract 3. Then, in FIG. 11, based on this value of VA1(2), the decision management system determines an appropriate action as dictated by decision D2.

The iteration number is then increased to three, and the system reiterates through the iterative decision tree. The system continues to iterate through the iterative decision tree until all iterations are complete as specified by the attribute associated with the tree governing the number of iterations for the current customer/account.

Further, the various decisions, such as decisions D1, D2, D3 and D4 in FIG. 11, can refer to iterative functions, such as, for example, iterative matrices, iterative decision trees, iterative score models, iterative list processors or iterative user exits.

For example, FIG. 14 is a diagram illustrating an iterative matrix referred to by decision D3 in FIG. 11, according to an embodiment of the present invention. Assuming that decision D3 is to increase the credit card limit of a credit card account, the iterative matrix in FIG. 14 indicates the amount by which the credit card limit should be increased. Referring now to FIG. 14, the iterative matrix has a virtual attribute "current limit ( )" on one axis, and a virtual attribute "risk score ( )" on the other axis. Various values for a credit card limit increase are at the intersection points of the matrix. For example, FIG. 14 illustrates a credit card limit increase amount of $400 at the intersection of a credit limit range of 401-600 and a risk score of 401-600, and illustrates a credit card limit increase amount of $500 at the intersection of a credit limit range of 601-800 and a risk score of 401-600. For each iteration of the tree in FIG. 11 which results in decision D3, the decision management system invokes the iterative matrix to determine the appropriate increase amount. Therefore, if the fifth iteration reaches decision D3, the decision management system refers to the appropriate intersection point in the iterative matrix corresponding to current limit (5) and risk score (5) to determine an appropriate credit line increase amount. This credit card increase amount can then be stored in a derived virtual attribute referred to as "increase amount ( )".

In a typical iterative matrix, the values on the axes do not change, and the values in at the intersection points do not change for each iteration. For example, the credit limit range of 601-800 and the risk score range of 401-600 on the axes do not change. Similarly, the credit card limit increase amount of $500 at the intersection of these ranges does not change. Instead, each different iteration would refer to different intersection points in accordance with the current limit and risk score values for that iteration.

Figure 15:
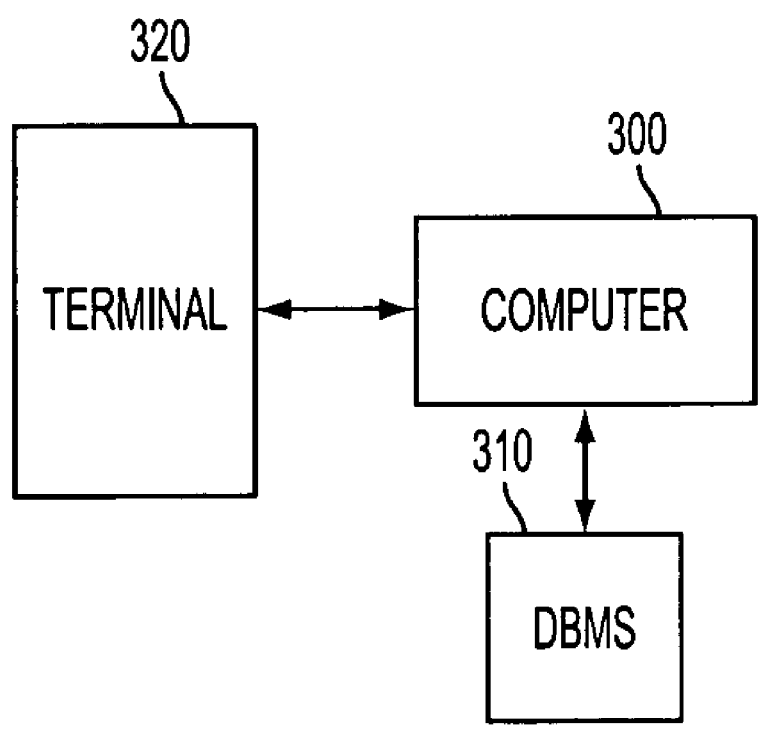
FIG. 15 is a diagram illustrating a simplified hardware architecture of a decision management system, according to an embodiment of the present invention.

FIG. 15 is a diagram illustrating a simplified hardware architecture of a decision management system, according to an embodiment of the present invention. Referring now to FIG. 15, the decision management system is embodied in software stored in a computer-readable medium, such as a memory of a computer 300. Computer 300 can be, for example, a server and associated memory. Computer 300 preferably has access to a data base management system (DBMS) 310 for storing and accessing accumulated data. A user accesses computer 300 possibly via a terminal 320 which can be, for example, a PC. Thus, computer 300, implementing the above embodiments of the present invention, can be seen as a device which, in a single pass, evaluates a customer and/or some/all accounts of that customer.

There are many different types of hardware configurations, including many different types of client/server architectures, which can be used. Such hardware configurations would be understood by a person of skill in the art.

Figure 16:
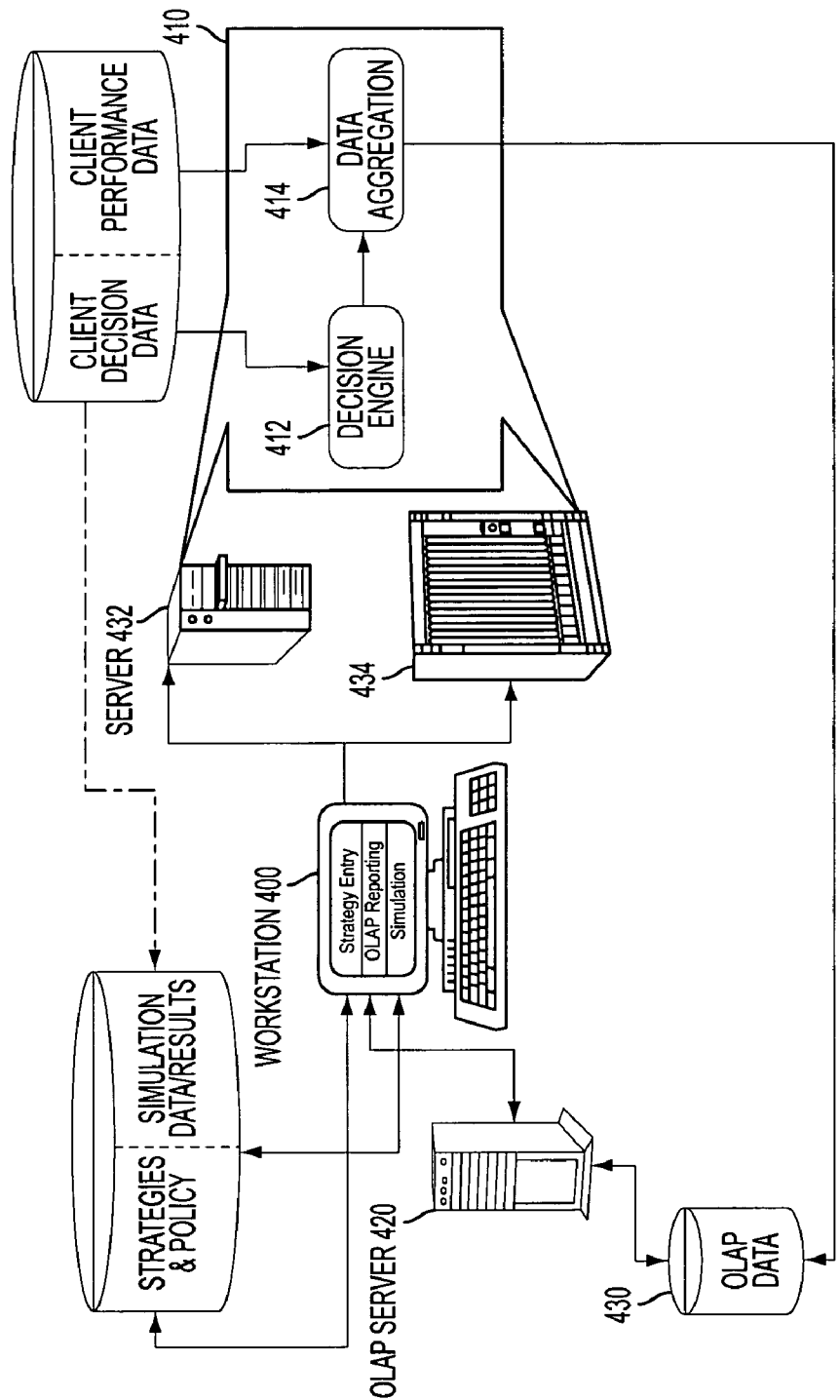
FIG. 16 is a diagram illustrating a more detailed hardware architecture of a decision management system, according to an embodiment of the present invention.

FIG. 16 is a diagram illustrating a more detailed hardware architecture of a decision management system, according to an embodiment of the present invention. Referring now to FIG. 16, a workstation 400 provides a centralized user interface through which a strategy analyst can control the system. The primary purpose of workstation 400 is to enable the entry, maintenance and propagation of decision strategies to a strategy execution platform 410 which includes a decision engine 412 and a data aggregation component 414. Workstation 400 also provides access to on-line analytical processing (OLAP) analyzing and reporting systems via an OLAP server 420 and OLAP database 430. OLAP technology is well-known and can be used to access, organize and evaluate customer and account data.

Decision engine 412 deploys the business decisioning rules entered on workstation 400 against customer data. A server 432 and a mainframe 434 typically run different processing modes, and provide the processing power for strategy execution platform 410. This architecture is highly scaleable and can operate in both on-request or batch processing modes as well as in both mainframe and client/server environments.

Potentially sharing the same environments as decision engine 412 is data aggregation component 414. Data aggregation component 414 is responsible for matching/merging decision engine output (i.e., scores and decisions) with the results of enacting recommendations of decision engine 412 (i.e., performance data). Data aggregation component 414 provides the information that OLAP server 420 accesses to provide strategy performance.

The OLAP portion of the system preferably uses a one to four tier architecture to allow a strategy analyst to do multi-dimensional analysis on the results of deployed strategies. The OLAP portion of the system can be extremely scaleable through the following configurations: data resides locally with a graphical reporting user interface (1 tier), data resides independently from the graphical reporting user interface (2 tiers), a server resides between the user interface and the data to expedite query requests and monitor strategy results (3 tiers) and/or a web server resides between the user interface and the OLAP server to enable mass browser-based distribution of reports (4 tiers). OLAP's multidimensional qualities provides analysts with the flexibility to "mine" their results, examining relationships in the data as well as the ability to perform ad hoc calculations and re-format views as required.

A decision management system is described above as being embodied, for example, in software stored in a computer-readable medium, such as a memory of a computer. However, a computer-readable medium is not intended to be limited to a memory of a computer. Instead, a computer-readable medium can be, for example, a computer disk, an optical disk or any other medium which is readable by a computer.

The above embodiments of the present invention relate to the use of iterative functions, such as iterative decision trees and iterative matrices. However, the present invention is not limited to use with these specific iterative functions. Instead, iterative functions can be virtually any type of function. For example, iterative functions can be iterative decision trees, iterative matrices, iterative score models, iterative list processors or iterative user exits.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer-implemented decision management process for evaluating a customer of an organization having more than one account, comprising:
    loading all customer and account data required for evaluating the customer and each of the accounts into a computer of a decision management system;
    evaluating the customer and each of the accounts via an iterative function which uses the loaded customer and account data by a computer of the decision management system, wherein said evaluating determines which strategy of a plurality of strategies will be used to evaluate each account via the iterative function based on a type of the account, and evaluates each account for a same product or service via the iterative function with the same strategy and evaluates accounts for different products or services via the iterative function with different strategies, to thereby produce a respective decision for each of the accounts, the loaded customer and account data being loaded at a time prior to initiating said evaluating and being sufficient to evaluate the customer and each of the accounts by said evaluating without loading additional customer or account data, the customer and each of the accounts thereby being evaluated in a single pass via the iterative function; and
    taking an action in accordance with a result of said evaluating.

2. A process as in claim 1, further comprising:
    providing the customer data and the account data to the process for evaluation on separate extracts.

3. A process as in claim 1, further comprising:
    providing the customer data and the account data to the process for evaluation on a plurality of extracts.

4. A process as in claim 3, wherein different extracts are associable with different data sources.

5. A process as in claim 1, wherein at least one of the customer data and the account data are accessed for evaluation via the iterative function via virtual attributes.

6. A process as in claim 1, wherein said evaluating comprises:
    evaluating the customer and each of the accounts for the same product or service via an iterative decision tree having virtual attributes and which iterates through in accordance with the number of said accounts for the same product or service of the customer.

7. A process as in claim 1, wherein said evaluating comprises:
    evaluating the customer and each of the accounts for the same product or service via an iterative matrix having virtual attributes and which iterates through in accordance with the number of said accounts for the same product or service of the customer.

8. A process as in claim 1, wherein said evaluating comprises:
evaluating the customer and each of the accounts for the same product or service via an iterative function having virtual attributes and which iterates through in accordance with the number of said accounts for the same product or service of the customer.

9. A process as in claim 8, further comprising:
storing results of iterations through the iterative function in a derived virtual attribute.

10. A process as in claim 1, wherein said evaluating comprises:
evaluating the customer and each of the accounts for the same product or service via an iterative function having both virtual attributes and non-virtual attributes and which iterates through in accordance with the number of said accounts for the same product or service of the customer.

11. A process as in claim 1, wherein said evaluating comprising:
evaluating the customer and each of the accounts for the same product or service via first and second iterative functions, each having virtual attributes and iterating through in accordance with the number of said accounts for the same product or service of the customer, wherein the first iterative function calls the second iterative function.

12. A process as in claim 11, wherein the first iterative function is an iterative decision tree and the second iterative function is an iterative matrix.

13. A process as in claim 1, wherein
said evaluating produces a respective decision for each account, the respective decision being a terminal node in a decision tree, and
said taking an action executes decisions produced for accounts.

14. A computer-implemented decision management process for evaluating a customer of an organization having more than one account, said more than one account including accounts for different products or services, the process comprising:
providing an iterative function to evaluate the customer and each of the accounts, the iterative function having virtual attributes for accessing at least one of customer data and account data;
iterating through the iterative function in accordance with the number of the accounts to thereby evaluate the customer and each of the accounts by a computer of a decision management system, wherein the iterative function determines which strategy of a plurality of strategies will be used to evaluate each account based on a type of the account, evaluates each account for the same product or service with the same strategy, and evaluates accounts for different products or services with different strategies, to thereby produce a respective decision for each of the accounts, and to thereby evaluate the customer and each of the accounts in a single pass via the iterative function; and
taking an action in accordance with a result of the evaluation of the customer.

15. A process as in claim 14, wherein the iterative function is one of an iterative decision tree, an iterative matrix, an iterative score model, an iterative list processor and an iterative user exit.

16. A process as in claim 14, wherein the iterative function calls another iterative function.

17. A process as in claim 14, wherein
said iterating produces a respective decision for each account, the respective decision being a terminal node in a decision tree, and
said taking an action executes decisions produced for accounts.

18. An apparatus for evaluating a customer of an organization having more than one account, comprising:
a computer-implemented evaluation device which loads all customer and account data required for evaluating the customer and each of the accounts, and evaluates the customer and each of the accounts via an iterative function which uses the loaded customer and account data, wherein the evaluation device determines which strategy of a plurality of strategies will be used to evaluate each account via the iterative function based on a type of the account, and evaluates each account for a same product or service via the iterative function with the same strategy and evaluates accounts for different products or services via the iterative function with different strategies, to thereby produce a respective decision for each of the accounts, the loaded customer and account data being loaded at a time prior to initiating the evaluation by the evaluation device and being sufficient to evaluate the customer and each of the accounts by the evaluation device without loading additional customer or account data, the evaluation device thereby evaluating the customer and each of the accounts in a single pass via the iterative function; and
an action taking system which takes an action in accordance with a result of the evaluation by the evaluation device.

19. An apparatus as in claim 18, wherein the iterative function has virtual attributes and iterates through in accordance with the number of said accounts.

20. An apparatus as in claim 18, wherein
the evaluation device produces a respective decision for each account, the respective decision being a terminal node in a decision tree, and
the action taking system an action executes decisions produced for accounts.

21. An apparatus for evaluating a customer of an organization having more than one account, comprising:
computer-implemented evaluating means for loading all customer and account data required to evaluate the customer and each of the accounts, and for evaluating the customer and each of the accounts via an iterative function which uses the loaded customer and account data, wherein said means determines which strategy of a plurality of strategies will be used to evaluate each account via the iterative function based on a type of the account, evaluates each account for a same product or service via the iterative function with the same strategy and evaluates accounts for different products or services via the iterative function with different strategies, to thereby produce a respective decision for each of the accounts, the loaded customer and account data being loaded at a time prior to initiating said evaluating and being sufficient to evaluate the customer and each of the accounts by said means without loading additional customer or account data, the customer and each of the accounts thereby being evaluated in a single pass via the iterative function; and
means for taking action in accordance with a result of the evaluation by the evaluating means.

22. A computer-implemented decision management process for evaluating a customer of an organization having more than one account for a first product or service, and more than one account for a second product or service different from said first product or service, comprising:
    loading all customer and account data required for evaluating the customer and each of the accounts into a computer of a decision management system;
    via an iterative function which uses the loaded customer and account data,
        determining whether each account is for the first product or service or for the second product or service by a computer of the decision management system,
        evaluating the customer and each of the determined accounts for the first product or service with a first strategy by a computer of the decision management system, and
        evaluating the customer and each of the determined accounts for the second product or service with a second strategy different from the first strategy by a computer of the decision management system, to thereby produce a respective decision for each of the determined accounts for the first product or service and for each of the determined accounts for the second product or service, the loaded customer and account data being loaded at a time prior to initiating said evaluating and being sufficient to evaluate the customer and each of the accounts via the iterative function without loading additional customer or account data, the customer and each of the determined accounts thereby being evaluated in a single pass via the iterative function; and
    taking an action in accordance with said evaluating the customer and each of the determined accounts for the first product or service and said evaluating the customer and each of the determined accounts for the second product or service.

23. A process as in claim 22, wherein said evaluating the customer and each of the determined accounts for the first product or service comprises:
    evaluating the customer and each of the determined accounts for the first product or service via an iterative decision tree having virtual attributes and which iterates through in accordance with the number of accounts for the first product or service of the customer.

24. A process as in claim 23, wherein said evaluating the customer and each of the determined accounts for the second product or service comprises:
    evaluating the customer and each of the determined accounts for the second product or service via an iterative decision tree having virtual attributes and which iterates through in accordance with the number of accounts for the second product or service of the customer.

25. A process as in claim 22, wherein said evaluating the customer and each of the determined accounts for the first product or service comprises:
    evaluating the customer and each of the determined accounts for the first product or service via an iterative matrix having virtual attributes and which iterates through in accordance with the number of accounts for the first product or service of the customer.

26. A process as in claim 25, wherein said evaluating the customer and each of the determined accounts for the second product or service comprises:
    evaluating the customer and each of the determined accounts for the second product or service via an iterative matrix having virtual attributes and which iterates through in accordance with the number of accounts for the second product or service of the customer.

27. A process as in claim 22, wherein said evaluating the customer and each of the determined accounts for the first product or service comprises:
    evaluating the customer and each of the determined accounts for the first product or service via an iterative function having virtual attributes and which iterates through in accordance with the number of accounts for the first product or service of the customer.

28. A process as in claim 27, wherein said evaluating the customer and each of the determined accounts for the second product or service comprises:
    evaluating the customer and each of the determined accounts for the second product or service via an iterative function having virtual attributes and which iterates through in accordance with the number of accounts for the second product or service of the customer.

29. A process as in claim 22, wherein said evaluating the customer and each of the determined accounts for the first product or service comprises:
    evaluating the customer and each of the determined accounts for the first product or service via first and second iterative functions, each having virtual attributes and iterating through in accordance with the number of accounts for the first product or service of the customer, wherein the first iterative function calls the second iterative function.

30. A process as in claim 29, wherein said evaluating the customer and each of the determined accounts for the second product or service comprises:
    evaluating the customer and each of the determined accounts for the second product or service via first and second iterative functions, each having virtual attributes and iterating through in accordance with the number of accounts for the second product or service of the customer, wherein the first iterative function calls the second iterative function.

* * * * *